Sept. 25, 1951 F. M. ROSAZ 2,568,825

CENTERLESS TRUING MACHINE

Filed April 18, 1949 17 Sheets-Sheet 1

INVENTOR:
François Marius Rosaz
BY
J. Delattre-Seguy
Attorney

Sept. 25, 1951 F. M. ROSAZ 2,568,825

CENTERLESS TRUING MACHINE

Filed April 18, 1949 17 Sheets-Sheet 2

INVENTOR:
François Marius Rosaz
BY
J. Delattre-Seguy
Attorney

Sept. 25, 1951 F. M. ROSAZ 2,568,825

CENTERLESS TRUING MACHINE

Filed April 18, 1949 17 Sheets-Sheet 3

INVENTOR:
François Marius Rosaz
BY
J. Delattre-Seguy
Attorney

Sept. 25, 1951 F. M. ROSAZ 2,568,825

CENTERLESS TRUING MACHINE

Filed April 18, 1949 17 Sheets-Sheet 4

INVENTOR:
François Marius Rosaz
BY J. Delattre-Seguy
Attorney

Sept. 25, 1951 F. M. ROSAZ 2,568,825

CENTERLESS TRUING MACHINE

Filed April 18, 1949 17 Sheets-Sheet 5

INVENTOR:
François Marius Rosaz
BY
J Delattre - Seguy
Attorney

Sept. 25, 1951 F. M. ROSAZ 2,568,825

CENTERLESS TRUING MACHINE

Filed April 18, 1949 17 Sheets-Sheet 6

INVENTOR:
François Marius Rosaz
BY
J. Delattre-Seguy
Attorney

Sept. 25, 1951 F. M. ROSAZ 2,568,825

CENTERLESS TRUING MACHINE

Filed April 18, 1949 17 Sheets-Sheet 7

INVENTOR:
François Marius Rosaz
BY
J. Delattre-Seguy
Attorney

Sept. 25, 1951 F. M. ROSAZ 2,568,825

CENTERLESS TRUING MACHINE

Filed April 18, 1949 17 Sheets-Sheet 8

INVENTOR:
Francois Marius Rosaz
BY
J. Delattre-Seguy
Attorney.

Sept. 25, 1951 F. M. ROSAZ 2,568,825

CENTERLESS TRUING MACHINE

Filed April 18, 1949 17 Sheets-Sheet 9

INVENTOR:
François Marius Rosaz
BY J. Delattre-Seguy
Attorney

Sept. 25, 1951 F. M. ROSAZ 2,568,825

CENTERLESS TRUING MACHINE

Filed April 18, 1949 17 Sheets-Sheet 10

INVENTOR:
François Marius Rosaz
BY
J. Delattre-Seguy
Attorney

Sept. 25, 1951 F. M. ROSAZ 2,568,825

CENTERLESS TRUING MACHINE

Filed April 18, 1949 17 Sheets-Sheet 11

INVENTOR:
François Marius Rosaz
BY J. Delattre-Seguy
Attorney

Sept. 25, 1951 F. M. ROSAZ 2,568,825

CENTERLESS TRUING MACHINE

Filed April 18, 1949 17 Sheets-Sheet 12

INVENTOR:
François Marius Rosaz
BY J. Delattre-Seguy
Attorney

Sept. 25, 1951 F. M. ROSAZ 2,568,825

CENTERLESS TRUING MACHINE

Filed April 18, 1949 17 Sheets-Sheet 13

INVENTOR:
François Marius Rosaz
BY
J. Delattre-Seguy
Attorney.

INVENTOR:
François Marius Rosaz
BY J. Delattre-Seguy
Attorney

Sept. 25, 1951 F. M. ROSAZ 2,568,825

CENTERLESS TRUING MACHINE

Filed April 18, 1949 17 Sheets-Sheet 15

INVENTOR:
François Marius Rosaz
BY J Delattre-Seguy
Attorney

Sept. 25, 1951 F. M. ROSAZ 2,568,825

CENTERLESS TRUING MACHINE

Filed April 18, 1949 17 Sheets-Sheet 16

INVENTOR:
François Marius Rosaz
BY Delattre-Seguy
Attorney.

Sept. 25, 1951 F. M. ROSAZ 2,568,825

CENTERLESS TRUING MACHINE

Filed April 18, 1949 17 Sheets-Sheet 17

INVENTOR:
Francois Marius Rosaz
BY J. Delattre-Seguy
Attorney.

Patented Sept. 25, 1951 2,568,825

UNITED STATES PATENT OFFICE 2,568,825

CENTERLESS TRUING MACHINE

François Marius Rosaz, Saint-Etienne, France, assignor to Microrex, Saint-Etienne, France, a French company Application April 18, 1949, Serial No. 88,141
In France April 30, 1948

8 Claims. (Cl. 51—103)

Centreless truing adds to the advantages of a high degree of accuracy in work of this kind an increase in the rate of production in comparison with a method of truing as carried out between centres such as used in normal practice. The centreless truing machines, in which this system of truing is adapted, in order to enable accurate work to be performed in a thoroughly satisfactory manner, must be provided with parts that are turned out and set in place with great care, thus ensuring the greatest exactitude and the certainty that high precision will be maintained, in addition to simplicity in handling and controlling the various parts, that is absolutely essential for the smooth running of this method of truing. As an answer to such demands, an improved type of centreless machine has been designed as described hereinafter.

For a clear definition of these improvements without however imposing any restrictions on the scope of the invention, accompanying drawings illustrate by way of example a preferred embodiment of my invention. In said drawings.

Figure 1:
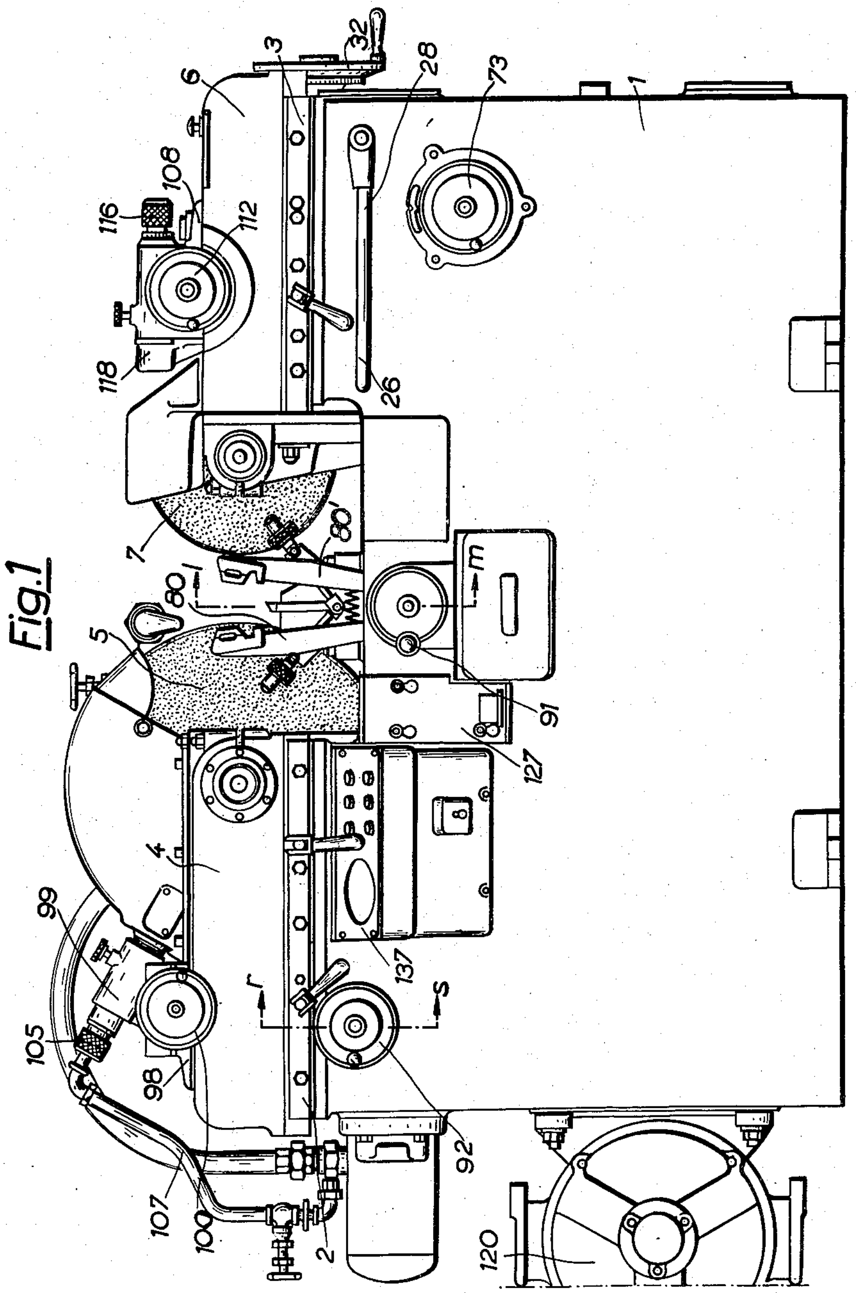
Figure 1 shows on a reduced scale an elevational frontal view of the improved centreless truing machine.

My improved centreless truing machine includes chiefly:

1. A frame 1 that is strongly ribbed and the body of which contains a supply of water for spraying during truing or setting operations. This frame carries on its upper portion dovetailed slides 2—3 on which move respectively: the carriage 4 of the truing abrasive wheel 5 and the carriage 6 of the driving wheel 7. These slides 2—3 are raised with reference to the abrasive wheels 5 and 7, so as to protect them and shelter them from abrasive materials and from the spraying liquid, this is a safeguard of prime importance since the good condition and the protection of the slides ensure satisfactory operation and accuracy that are essential for these machines. This frame is provided also with raised portions on which are fastened the control-boards, inspection holes, motors, gear-box and other control arrangements for the abrasive wheels, for the movement of carriages, grinding, spraying, raising of the grinding-wheels, etc. that make this truing machine a perfectly self contained unit.

Figure 4:
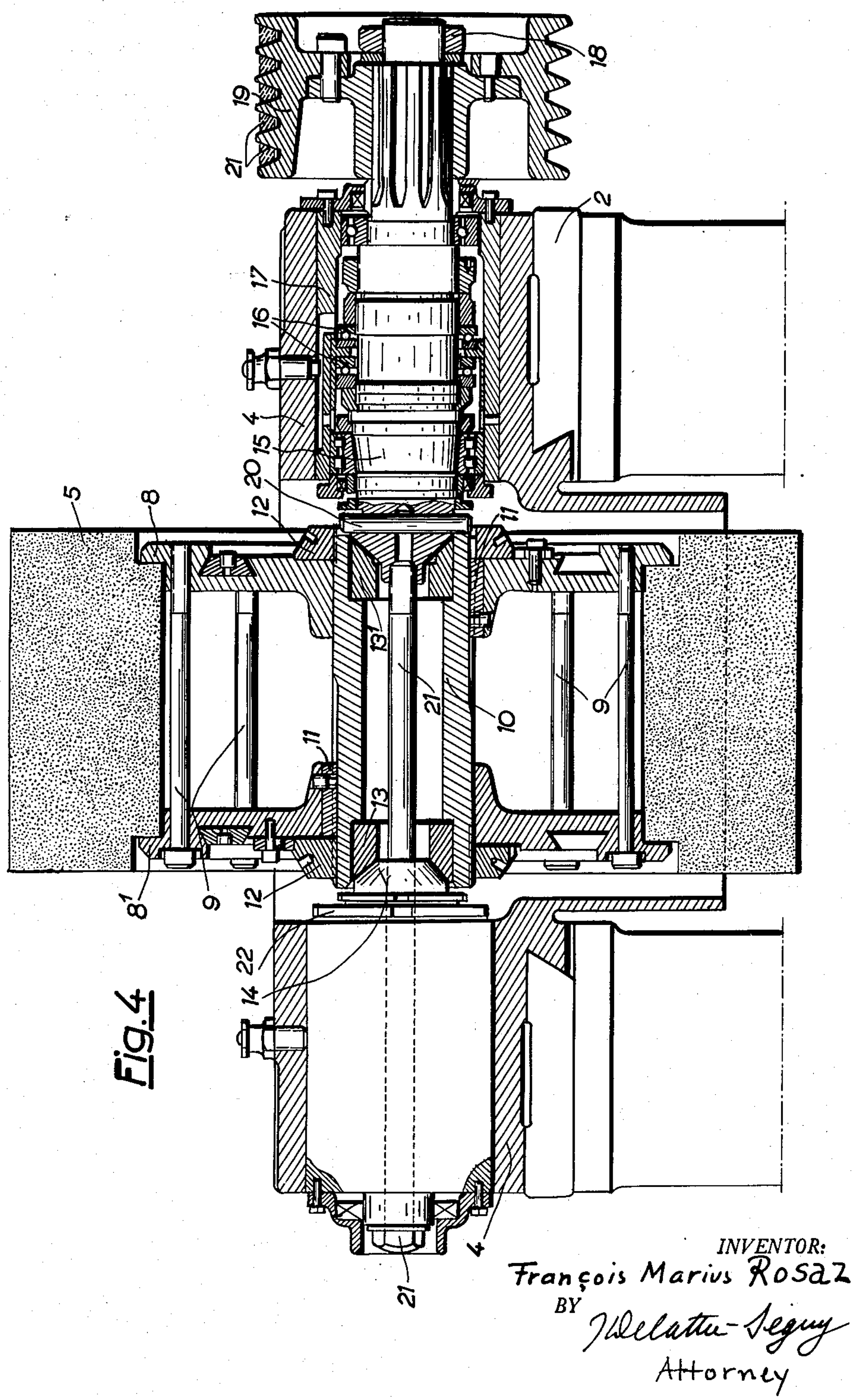
Figure 4 represents on a reduced scale a sectional view of the setting of the abrasive wheel on its hub and the spindles.

2. A working-head supporting the spindles of the truing abrasive wheel 5 (Figure 4). This is a delicate part of the machine that must be turned out with a high degree of precision and set faultlessly so as to ensure precision work. For that reason, the truing abrasive wheel 5 is clamped and centered between the cheek plates 8 and 8' connected together by the tightening screws 9; these cheek plates and consequently the grinding-wheel therewith are fastened on the hub 10 by the keys 11; two clamping nuts 12 with nut-locks are screwed on the ends of the hub 10 and act against the cheek plates, thus enabling together with the clamping, the side adjustment of the position of the abrasive wheel to be carried into effect. At the end of the hub and in holes drilled therein are housed two sockets or spiders 13 and $13^1$ with a tapered entry that enables the abrasive wheel and hub assembly to be centered and to bear on the nose end of the spindles 14 and 15 having the same taper. These spindles are centrally positioned and carry by means of ball-bearings, counter-cheeks 16 for taking up side stresses, said counter-cheeks held in ball-races 17 that are themselves set in borings of the carriage 4 that moves on the slides 2 of the frame. The spindle 15 is finished off by a fluted bearing surface on which is positioned and fastened by the nut 18 the driving pulley 19 shaped to take trapezoidal belts; At the other end the spindle 15 has passed through it a catch-pin 20 also housed in two notches of the hub 10 which causes the wheel and hub assembly to revolve as one piece with the spindle 15 or driving spindle. A central bolt 21 passes entirely and freely through the spindle 14 along its axis in order to be screwed in the end of the spindle 15; the head of this central bolt bears on the end of the spindle 14 and by screwing up tightly locks the wheel-hub assembly between the conical nose ends of the spindles without for that reason giving rise to stresses out of the ordinary on the ball-races of which the adjustment for picking up any play is carried out by nuts 22; the opposing side thrusts being taken up, as stated above, by the precision counter cheeks 16. Finally, carefully located joints keep any dust and other upsetting influences away from the machine parts.

Figure 5:
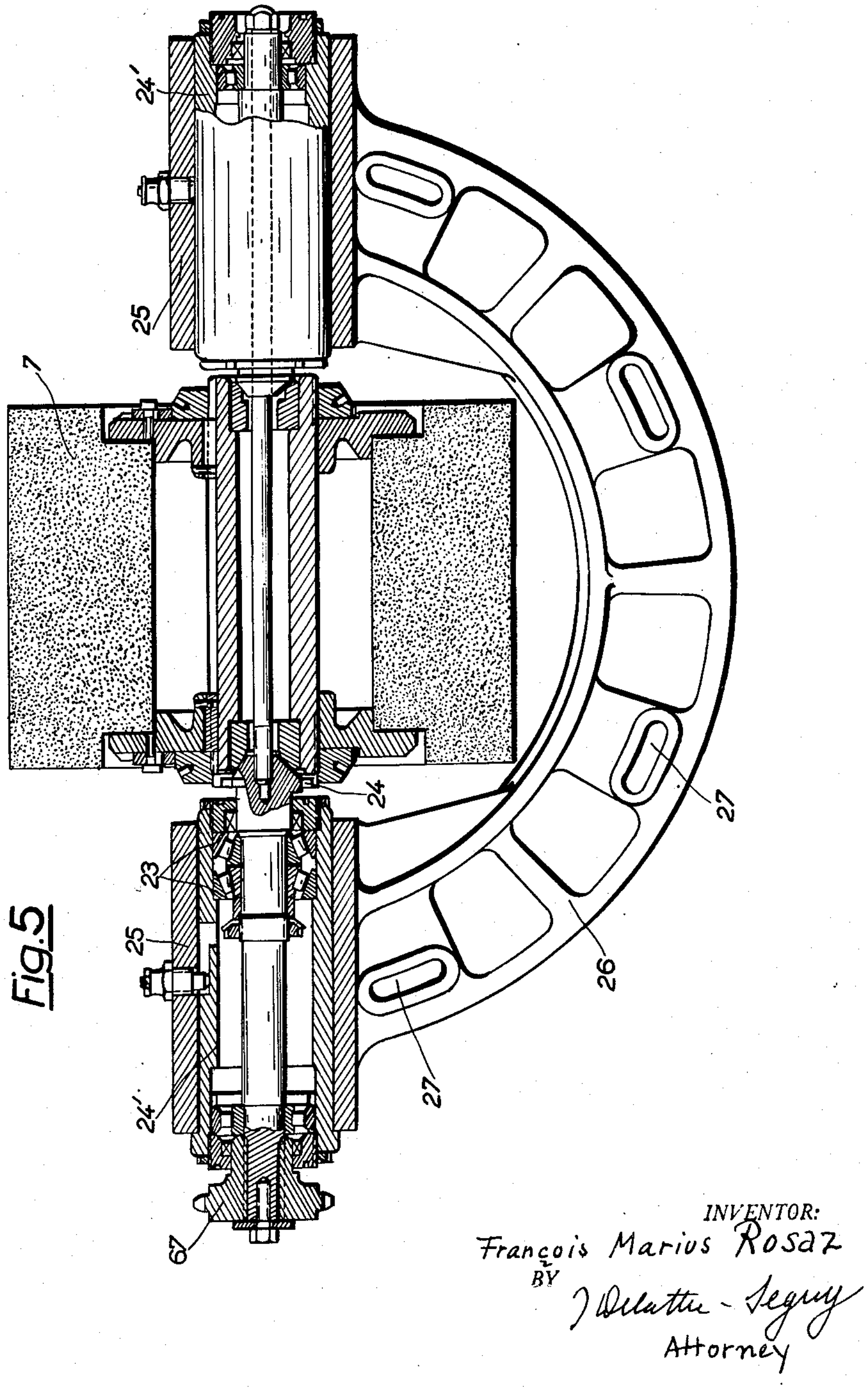
Figure 5 shows on a reduced scale a sectional view of the said assembly for the setting of the driving abrasive wheel on its hub and the spindles.
Figures 6, 7, 8, 9, 10:
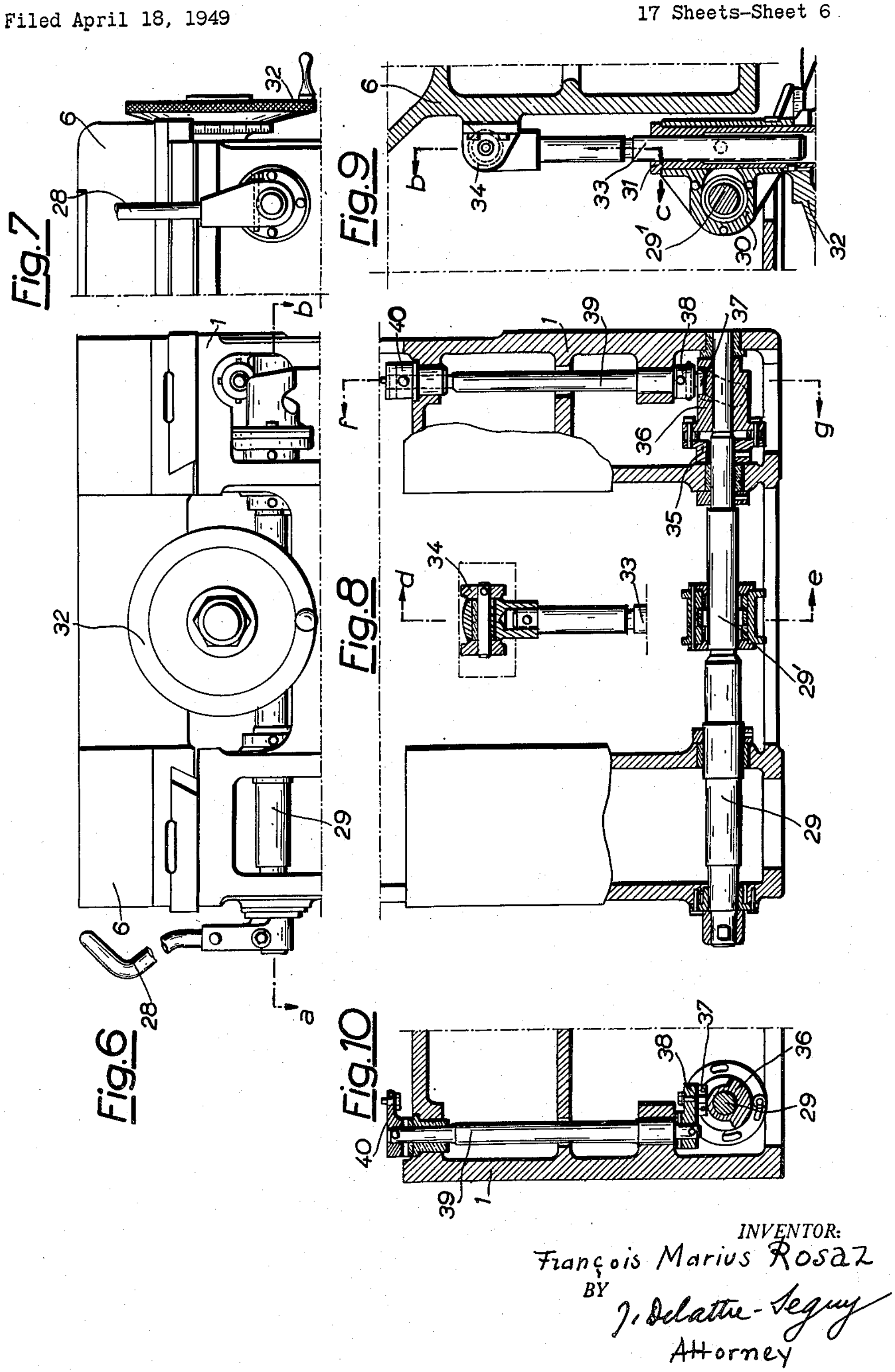
Figure 6 shows on a reduced scale a part outside and side view of the assembly of the machine illustrating the control device for the carriage of the driving-grinding wheel and the control of the dipping and ejection means.
Figure 7 is a part view turned sideways corresponding to Figure 6.
Figure 8 is a plan partly sectional view taken along the lines *a*—*b* (Figure 6) and *b*—*c* (Figure 9) corresponding to Figure 6.
Figure 9 is a sectional view along the line *d*—*e* (Figure 8) and corresponding to Figure 8.
Figure 10 is a sectional view along the line *f*—*g* (Figure 8), corresponding to Figure 8.

3. A driving head carrying the spindles of the driving abrasive wheel 7 (Figure 5), that shows a certain number of salient assembly features similar to those of the working head, especially the assembly of the abrasive wheel between cheek plates keyed on a hub in which are housed sockets or spiders that are centered and bear on the tapered nose-shaped ends of the two spindles, the tight clamping of the wheel and hub assembly between these tapered nose-shaped ends through a central bolt without any abnormal stresses on the bearings, the side stresses being taken up in this vase by opposed taper roller bearings 23, the keying and fastening to the end of the driving spindle of a driving pinion 67 that engages a chain, the driving spindle carrying at the other end two fingers 24 engaged in the notches of the hub and driving the hub-wheel assembly. However in this case the spindles are centered and carried by means of roller-bearings in the bearing casings 24' that are themselves set in the bored-out portions of the bearings 25 of a half-round ribbed cradle 26. The latter forms bearings cut out by slots 27 through which pass bolt and nut systems that may thus fasten at the required slope this cradle on the driving carriage 6 sliding on the slideways 3.

4. An arrangement of combined controls of the driving carriage 6, of the control of the intermittent operation in the case of truing of shouldered pieces and of the control of the ejection of the work pieces in the case of truing by intermittent operation (Figures 6, 7, 8, 9, 10, 17, 18). This arrangement is located at the end of the frame 1, on the side corresponding to the driving abrasive wheel. It is provided with a lever 28 showing a long working handle and keyed on the eccentric shaft 29 running in shouldered and bushed bearings of the frame 1. This shaft is offset in its middle portion $29^1$ on which is set, by means of needle bearings, a nut head 30 (Figure 9) in the boring of which is housed the fixed nut 31 on which is keyed the handwheel 32 that controls the movement of the driving carriage 6 by actuating the fixed nut 31 that works together with a micrometric control screw 33 that is caused to move together with the bearing 34 on which the screw is attached and consequently with the driving carriage 6, to which is fastened the said bearing 34.

Set up in this way, according to the diameter of the shouldered piece to be trued by dipping, the driving abrasive wheel 7 may be brought close by moving its carriage 6 through the working of the hand wheel 32 by a distance near the truing diameter to be obtained by carrying out successive truing trials until the required value of diameter is obtained. When this adjustment is made by the hand wheel, it should be left unaltered and the intermittent operations are carried out by working the lever 28 that moves simultaneously, through a turning of the above described offset shaft 29, the assembly including the abrasive wheel, carriage, etc. through the agency of the nut head 30 set on the eccentric portion 29' by means of needle bearings that damp down the repeated reciprocating motions. Through this eccentric form of control the untimely and very harmful wear is avoided of the micrometer screw 33, that is certain to take place if the dips were controlled by working the handwheel 32.

Figure 17:
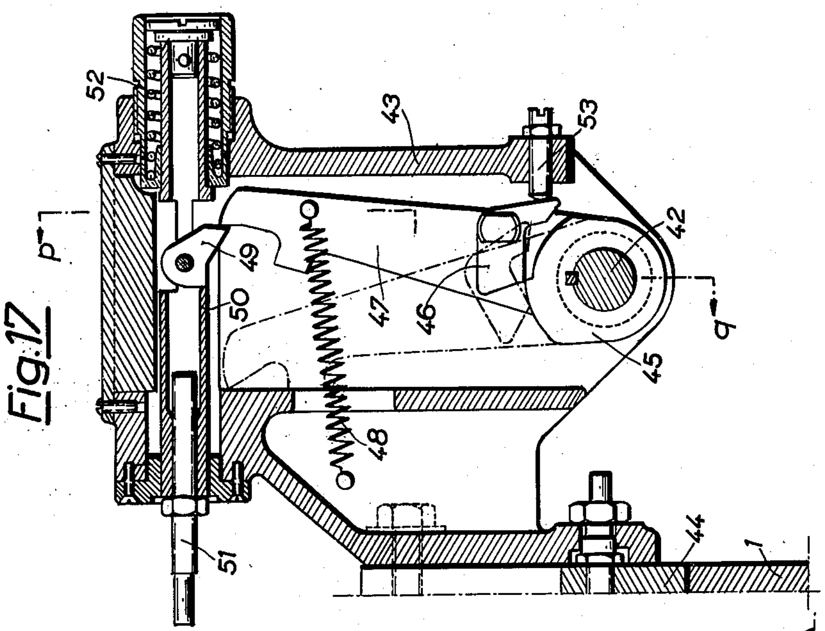
Figure 17 shows on a reduced scale and in section along line *n*—*o* (Figure 18), the device used as a stop for the work and constituting an ejector that is set on the machine for truing through intermittent operation of shoulder pieces. The dotted line shows the pawl and the actuating lever after the injection of a piece.
Figure 18:
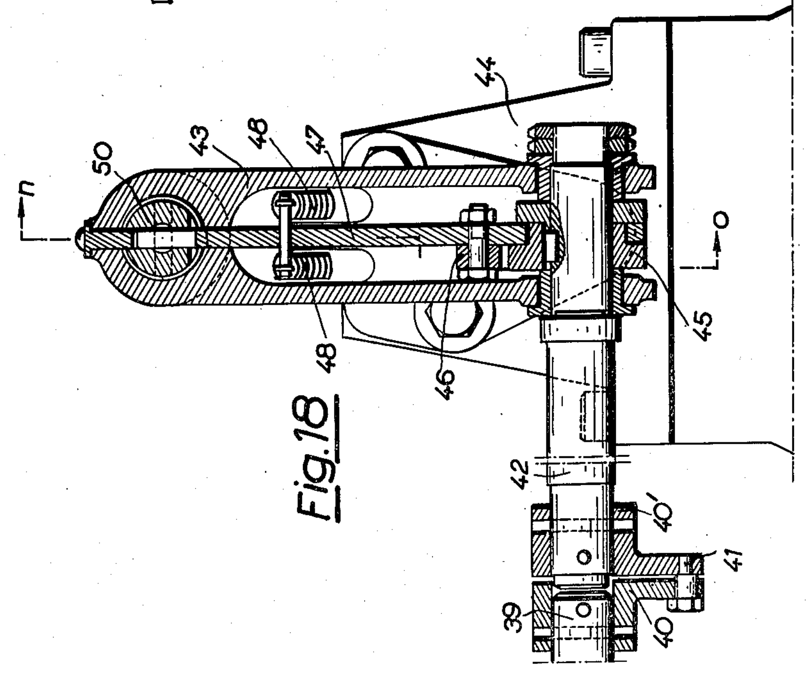
Figure 18 is a sectional view along *p*—*q* (Figure 17), corresponding to Figure 17.

Referring to the control for ejection of the work pieces when truing by intermittent operations, there is keyed on the end of the shaft 29 a small control plate 35 that drives a ring 36 at the periphery of which is cut a spiral groove. Said groove engages for cooperation a bearing member 37 running on a bearing surface of the link 38 that is itself centered and pinned on a transmission shaft 39. The latter is centered in inner bearing surfaces of the frame 1 and carries centered and pinned on its other end a link-rod 40 placed side by side with respect to an identical small rod 40' (Figure 18), the two rods being angularly rigid with one another through a driving screw 41 engaged in the wrist-pins of the said small rods; but the small rod 40' is pinned and centered on the end of a shaft 42 in alignment with the shaft 39, the said shaft 42 being axially carried by the ejector support 43 fastened on the support of the guide-bars 44 (Figure 17). On the end of the shaft 42 is keyed a ratchet 45 that drives, by striking against a pawl 46, the actuating lever 47 turning freely on a bearing surface of the ratchet 45; the said lever is submitted to the action of two spiral tension return springs 48; the actuating lever 47 draws in its rearward turning movement the pawl 49 of the piston 50 into which is screwed the threaded rod 51 having an adjustable amount of projection and acting as a stop and ejector for the trued work pieces. A spring 52 ensures the return of the piston of the ejector rod backwards after release from the actuating lever.

It follows as a result of this arrangement that by working the lever 28 the dip of the driving abrasive wheel is controlled and by means of the spirally grooved ring, the small rods and shafts, there is a simultaneous control of the return of the control-lever 47 that then picks up the pawl 49, when the truing has been carried out; the pawl 46 of the control-lever is disengaged from the ratchet 45 by abutting against the adjustable screw 53, the control-lever 47 is freed and subjected to the sharp forward return of the springs 48 while drawing along through the pawl 49 the piston 50 and the threaded rod 51 that ejects the trued piece.

Figure 11:
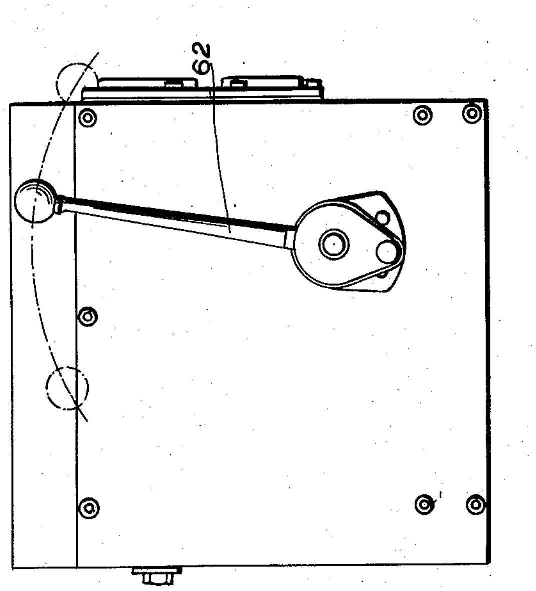
Figure 11 shows on a reduced scale an outer front view of the gear-box enabling work to be carried out in combination with the speed-changer with a view to adjusting the speed of the driving wheel while running.
Figure 12:
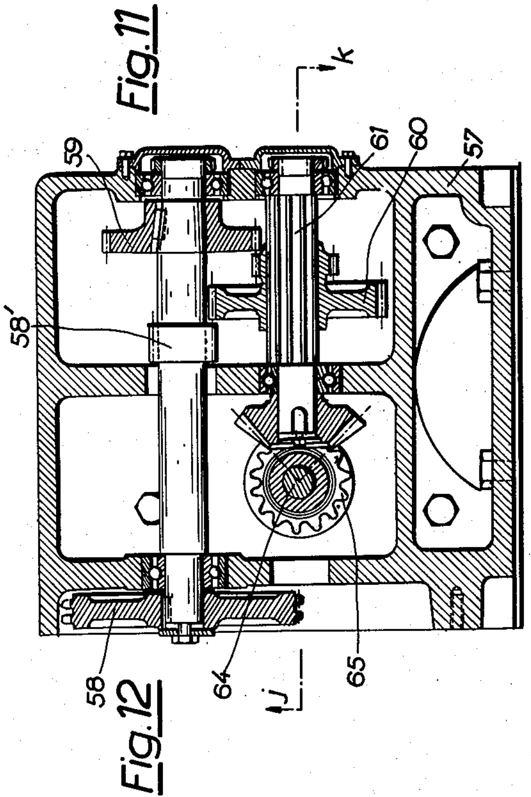
Figure 12 shows on a reduced scale and in elevation a section of the gear-box taken along the line *h*—*i* (Figure 13).
Figure 13:
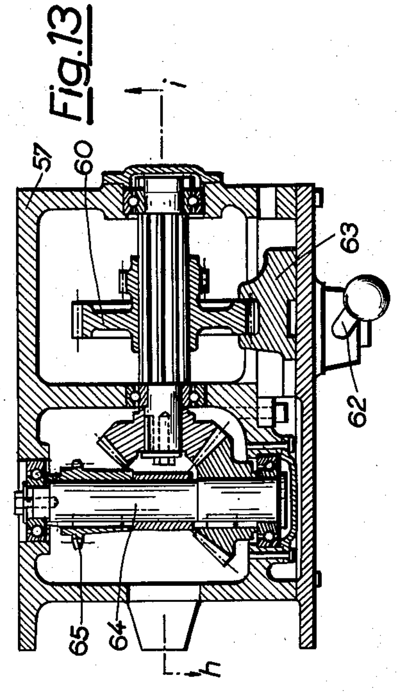
Figure 13 shows a plan partly sectional view along *j*—*k* (Figure 12), corresponding to Figure 12.

5. Control of the speed-changer (Figures 21 and 22) and speed-change box for the driving abrasive wheel during the running of the machine (Figures 11, 12, 13).

Figure 2:
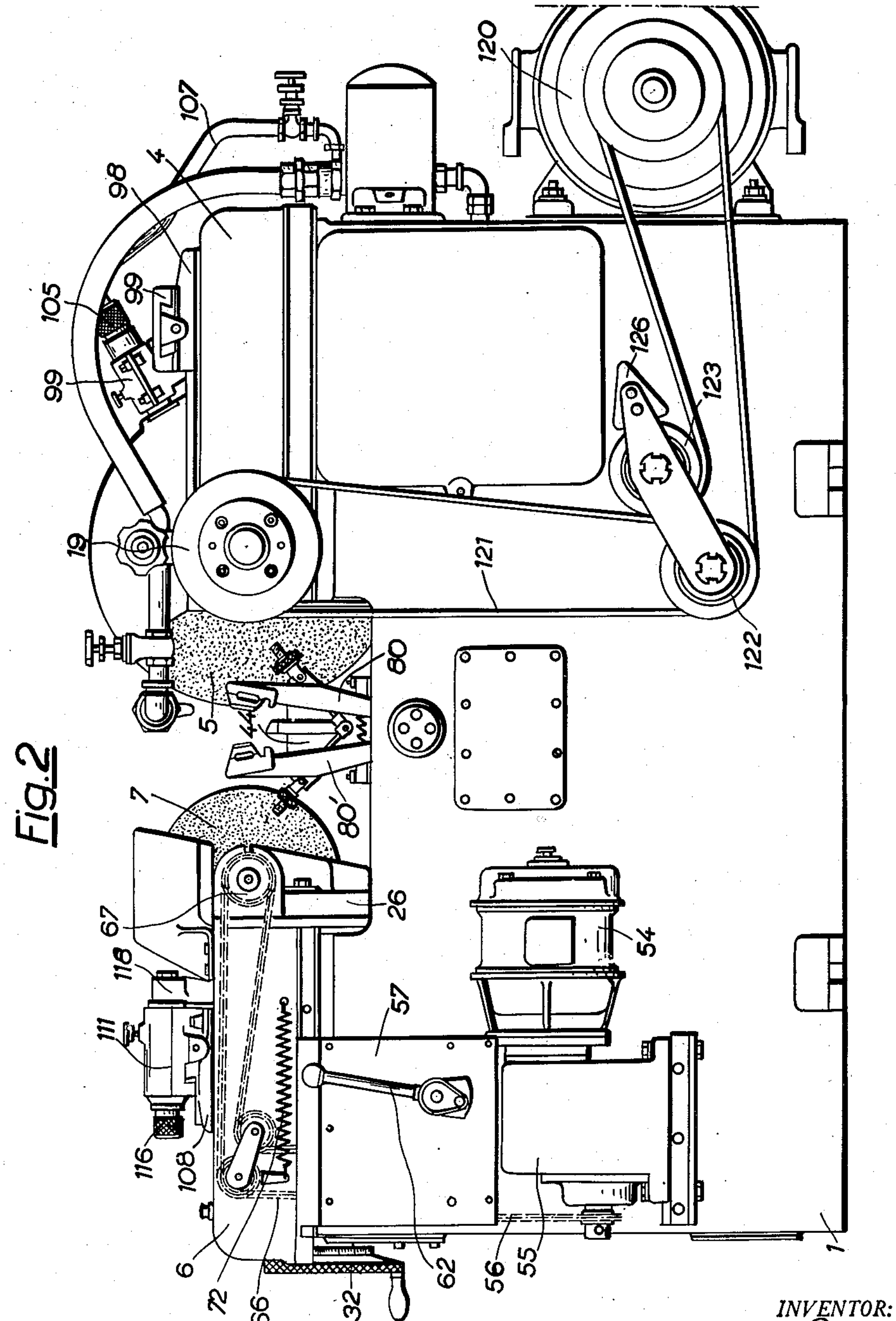
Figure 2 shows on a reduced scale an elevational assembly view of the rear of the centreless truing machine.
Figure 3:
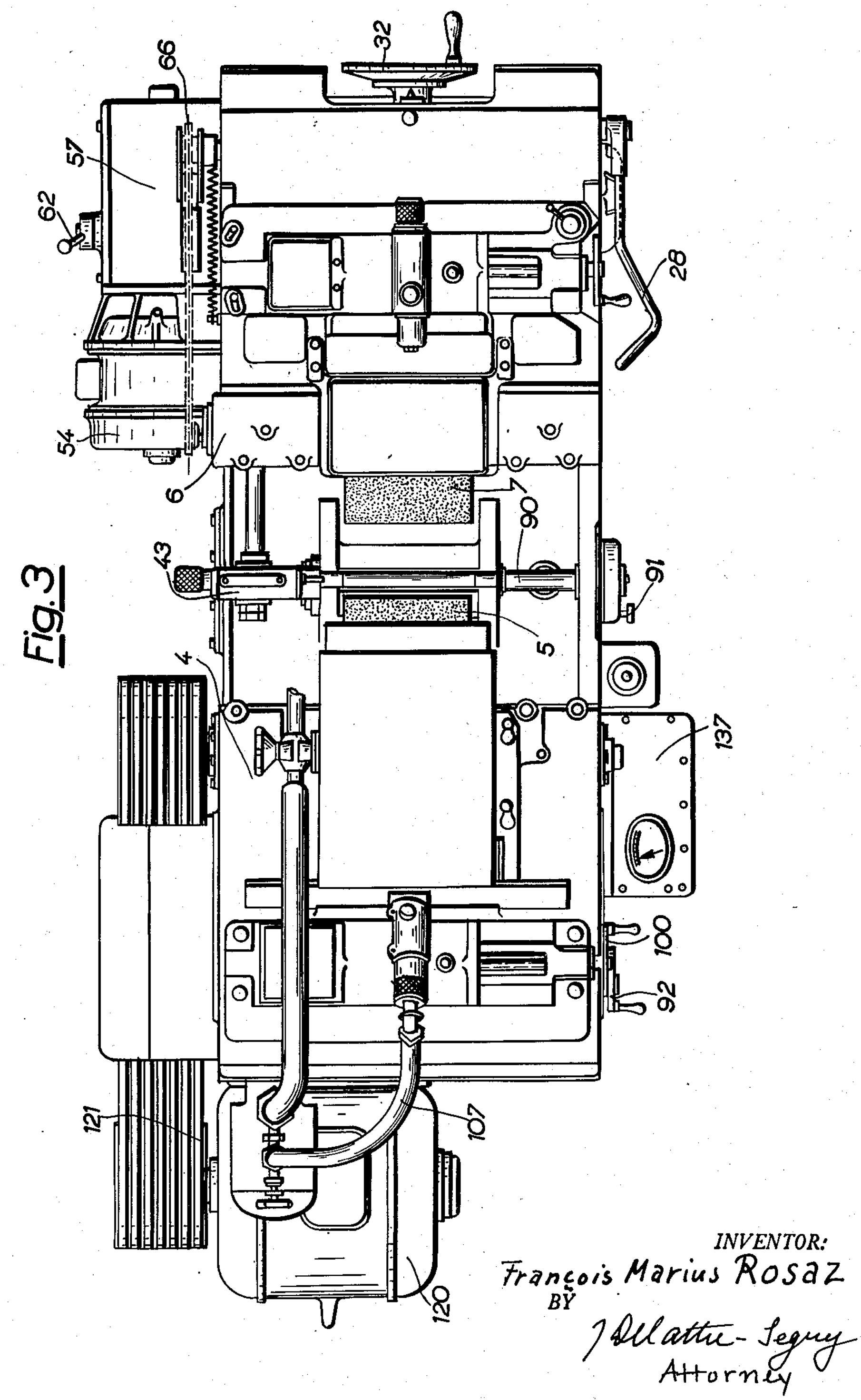
Figure 3 shows on a reduced scale a plan of the assembly of the centreless truing machine.
Figure 29:
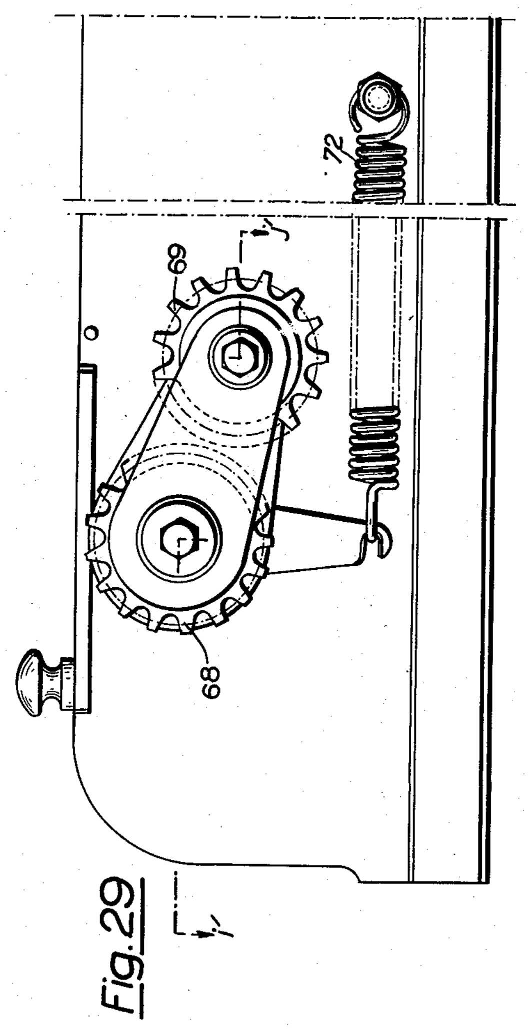
Figure 29 shows on a small scale, an outer elevational view of the tightening means for the chain that controls the abrading wheel.
Figure 30:
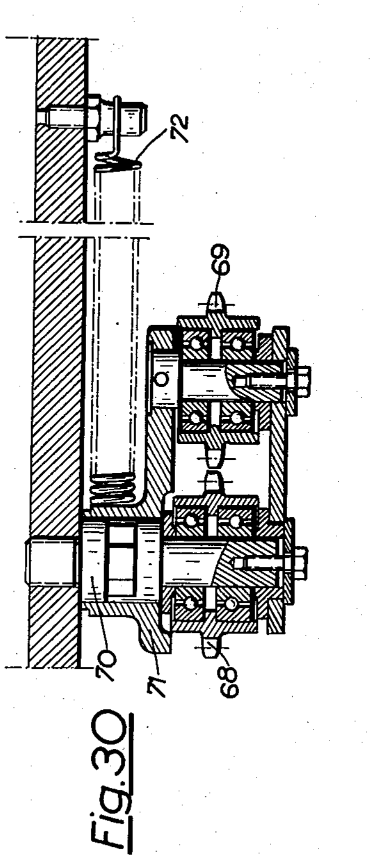
Figure 30 is a partly sectional plan view along line $i'$—$j'$ of Figure 29.

According to the variations in working conditions for truing, it is requisite to obtain a great difference in speeds for the pieces to be trued. It is with this object in view that the speed of the control motor 54 (Figure 2) is transmitted to a speed-changer 55 fastened to the frame and that presents a primary range of speed changes. The motion is transmitted through a toothed pinion and chain 56 to the gear-box fastened by its casing 57 on to the frame (Figures 11, 12, 13). The motion is taken by the toothed pinion 58 centered and keyed on the primary shaft carrying a small pinion at 58' and provided with a keyed pinion 59 adapted to engage a toothed member of the sliding gear 60 that moves on the secondary grooved shaft 61 through the working of the control lever 62. The latter actuates a small rod moving the fork 63 and consequently the sliding gear 60. It is obvious that if the sliding gear 60 engages with 58' the speed taken by the pinion 58 is decreased and the speeds for truing work are maintained, while when the sliding gear is engaged with the gear 59, the speed received is increased which corresponds to the setting speeds of the abrasive wheel. The speed of the secondary shaft 61 is transmitted to a counter shaft 64 through bevel gears; A gear 65 is keyed on the counter shaft that engages with a chain 66 that transmits the speed to the control gear 67 of the driving spindle of the abrasive wheel 7, the chain 66 being tightened and sent over the chain tightening device (Figures 29–30) made up of two toothed pinions 68 and 69; the gear 69 is centered on an arm of a hub 71 also centered on the tightener spindle 70 and of which another arm is subjected to the action of a tensioning spring 72.

Figure 22:
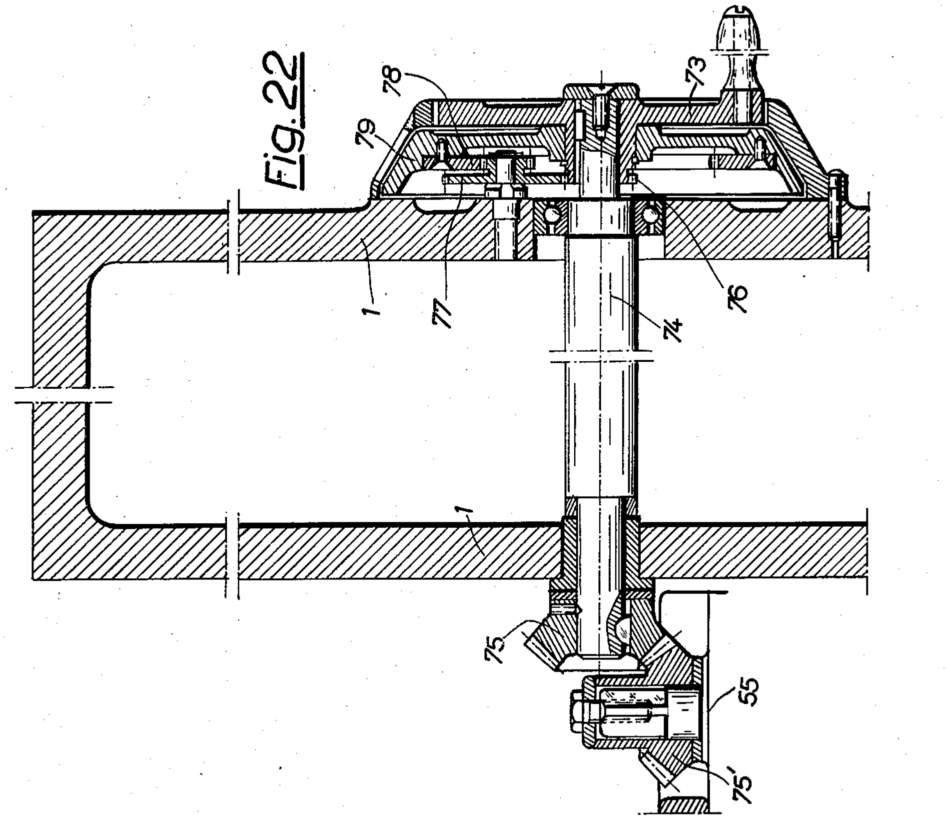
Figure 22 is a sectional view along *v*—*w* (Figure 21), corresponding to Figure 21.
Figure 21:
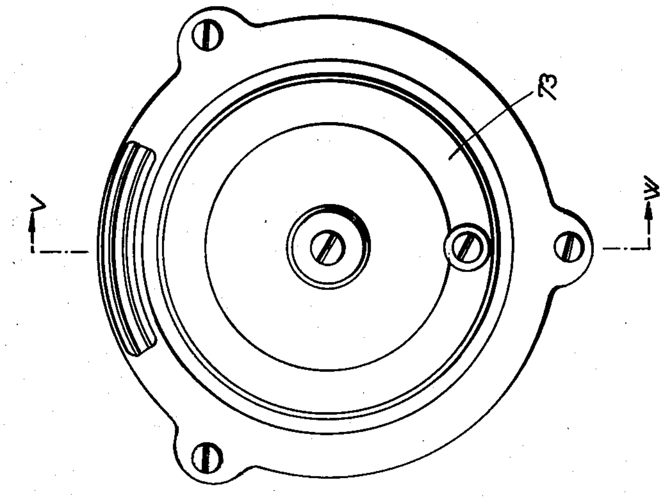
Figure 21 shows on a small scale, an outside front view of the speed-change control.

A handwheel 73 enables the control to be effected of the speed changer 55 (Figures 21 and 22). This handwheel is keyed on a transmission shaft 74 centered and carried, through the agency of bearings and ball-races, in the walls of the frame 1. A set of bevel-gears 75—75' ensures the link up with the speed-change 55. The indications of the movements of the handwheel 73 and consequently of the control of the gear-change are transmitted through the gear 76 and planet-wheel 77 engaged with the sun-wheel 78, the latter being fixed rigidly with a rotary vernier 79 on which are read the indications desired.

Through the gear-change and the speed-box, an extensive range of speeds is obtained for the driving abrasive wheel, ranging from 17 to 600 R. P. M., which enables a suitable speed to be attained in the various cases and for the best rate of working.

Figures 14, 15:
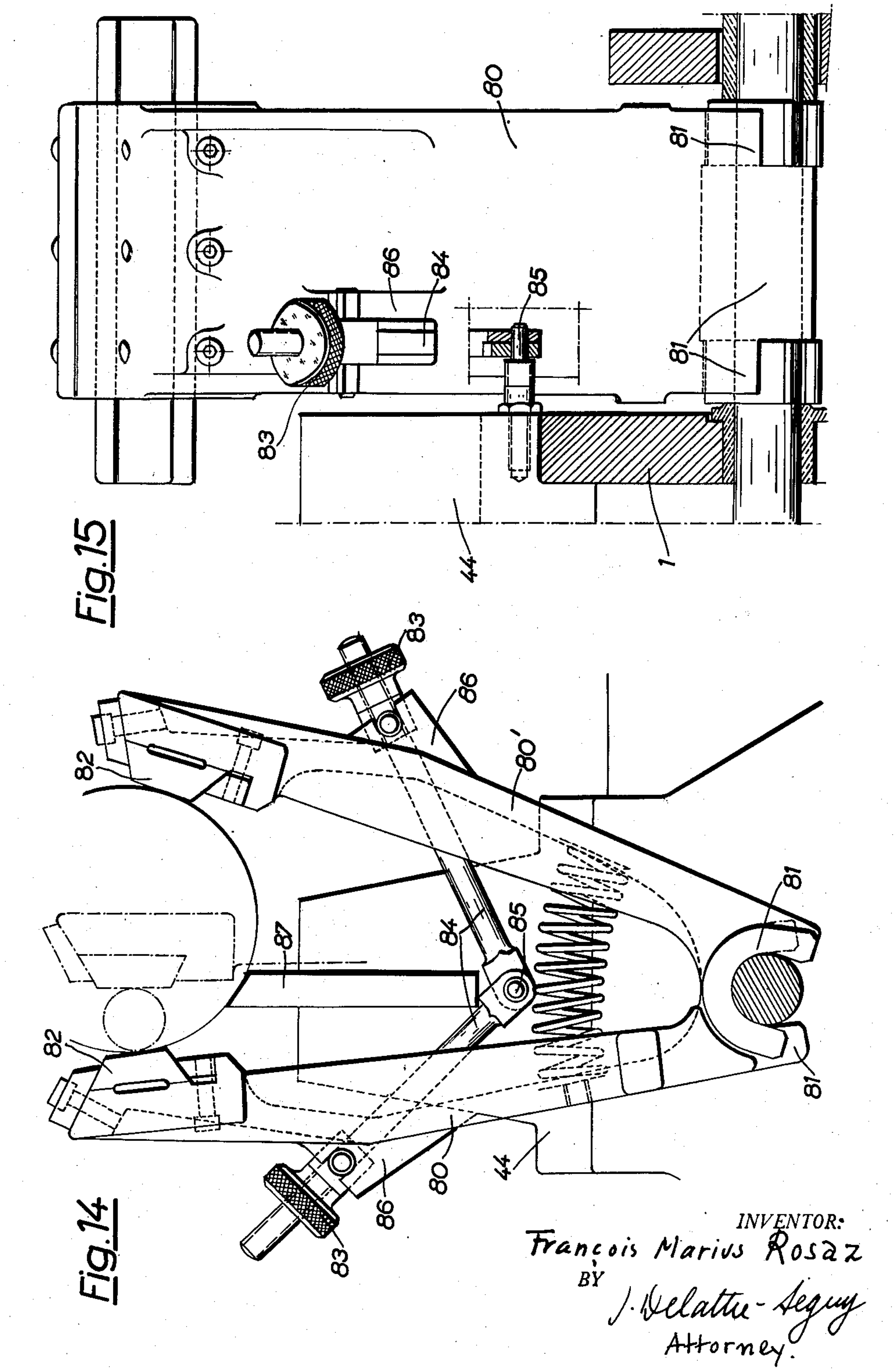
Figure 14 shows on a reduced scale an outer elevational view of the guide-rests of which use is made for successive continuous truing operations. The dotted outline shows the adjustment of the rests for a successive truing of work pieces of small diameter.
Figure 15 is an outer side view, corresponding to Figure 14, of the guide-rests.
Figure 16:
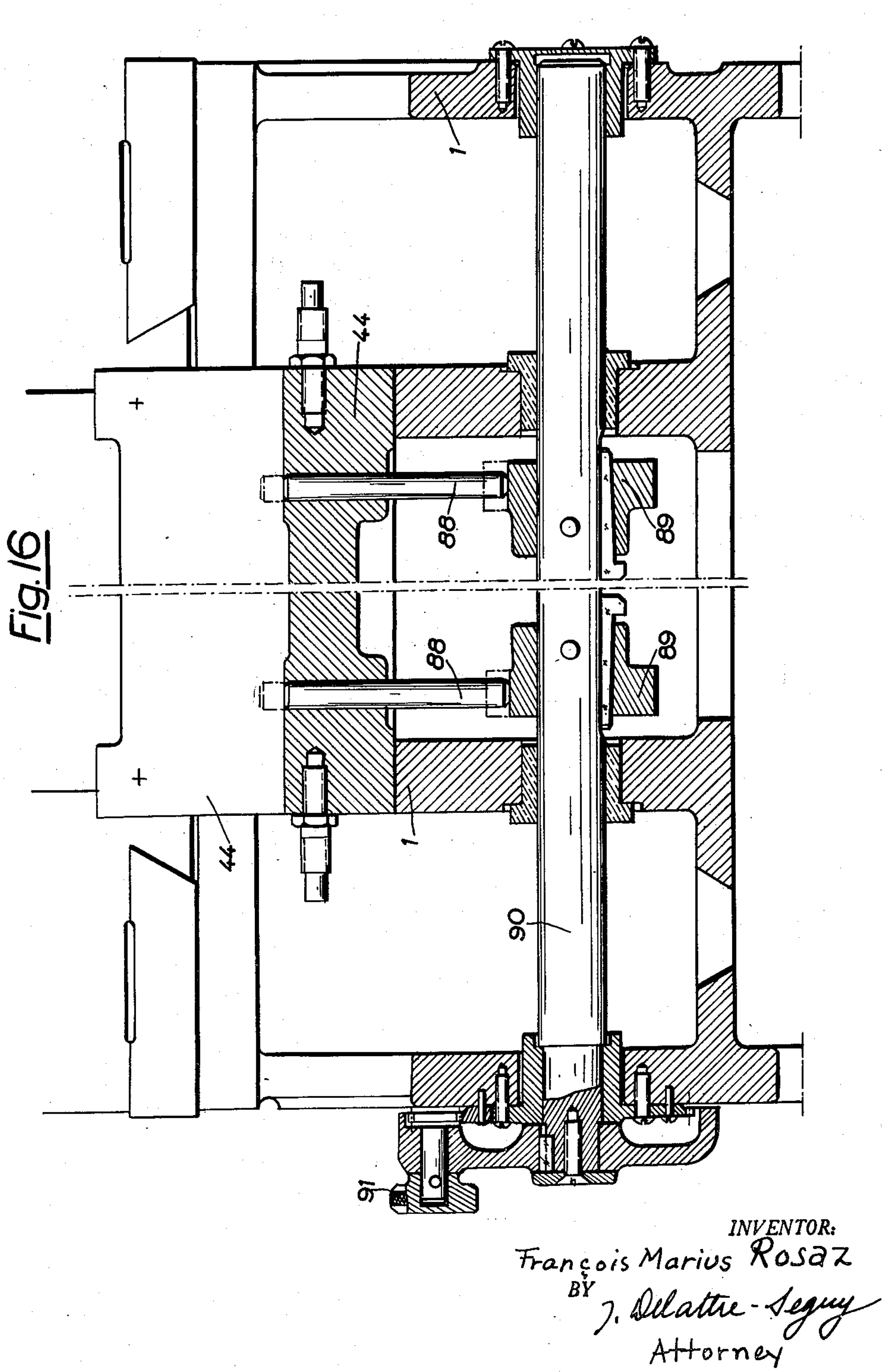
Figure 16 shows on a reduced scale, in a sectional view through *l*—*m* (Figure 1), the control through differential pinions provided for raising the guide-bars as well as the supporting spindle of the guide-rests. The dotted line shows a change in position of the lifting cams and the corresponding position of the lifting rods of the guide-bar.

6. Movable guide-rests for truing in series (Figures 14–15) and supporting device for the movable guide rests and for control of the raising of guide-bars (Figure 16).

The movable guide-rests are used for the work of truing in series, that is to say when the pieces to be trued flow in a continuous way between the abrasive wheels. These are provided with two identical pairs of guide rests. Each pair includes two guide-rests 80 and 80' of which the lower bearing surfaces 81 interengage over a hinge pin and are hollowed out half way round to enable the guide-rests to be quickly put into position on the machine by merely placing them on the hinge shaft, or to withdraw them just as easily. In their upper portion through clamping rods and supporting dovetail bars, the guide-rests hold the series guides 82 of suitably treated steel against which slide the work pieces during the truing. According to the diameter of the pieces to be trued, the bringing nearer or drawing apart of the guides 82 is carried out through a movement of the guide-rests 80—80' by operating the milled knobs 83 that work together with the eye-bolts 84 turning on a spindle 85 fastened to the support of the guide-bars; the milled knobs 83 act on a bearing surface 86 of the guide rests through the agency of rings bearing through their journals in notches of the bearing surfaces 86.

According to the work pieces to be trued, it is easy to place in position or withdraw the suitable guide bar 87 on which the work pieces have to slide during the operation. These guide-bars are housed in a slot of the rest for the guide-bars 44 fastened to the frame 1. The raising of the guide-bars is carried out by means of the rods 88 housed (Fig. 16) in the rest 44, said rods being subjected to the movements of the cams pinned and keyed on the supporting and lifting shaft 90 centered and carried inside the walls of the frame 1 by means of bearings and controlled in an accurate manner for lifting by a milled knob 91 fixed rigidly with a planet-gear meshing with a fixed sun-wheel. It will be observed that on the support of the guide-bars 44 is also fastened, as pointed out previously, the ejector support 43 with the device for ejection of the work pieces at the time of truing through a dipping action.

Figure 20:
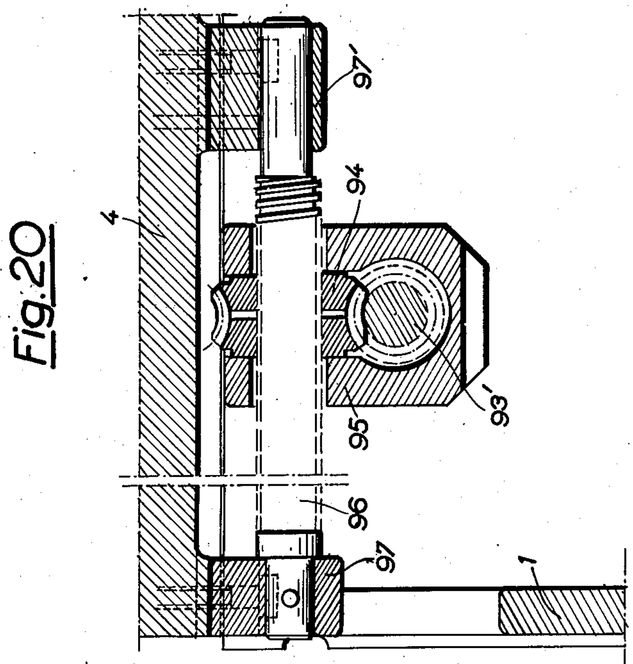
Figure 20 is a sectional view along *t*—*u* (Figure 19), corresponding to Figure 19.
Figure 19:
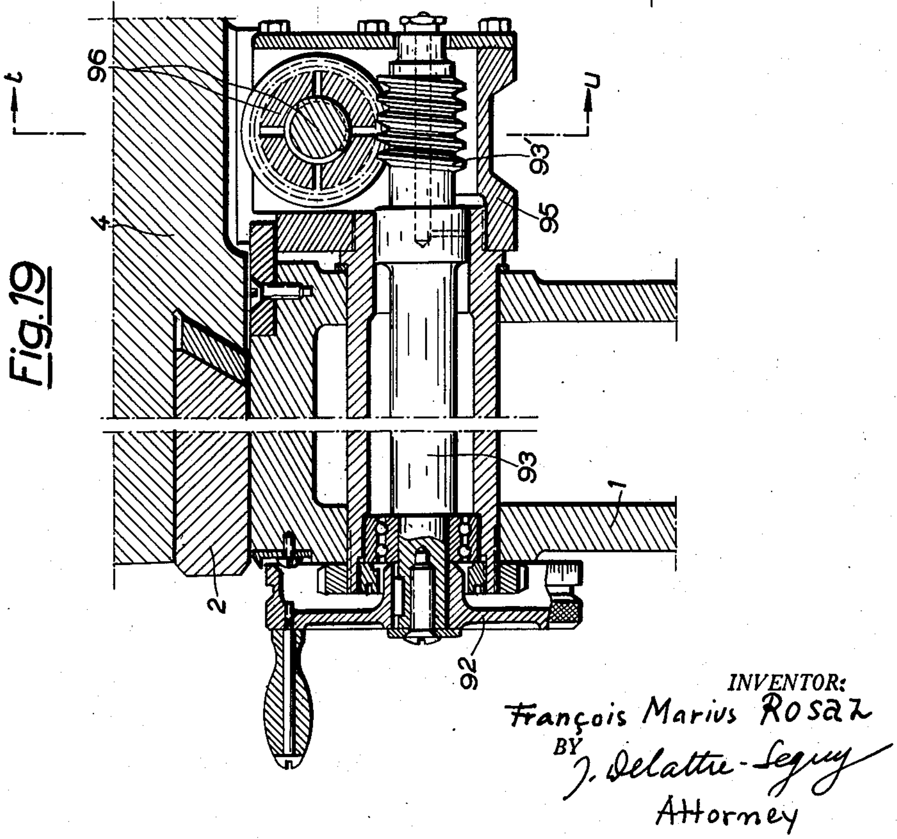
Figure 19 shows on a small scale, a sectional view along *r*—*s* (Figure 1), the control for the feed movement of the working carriage.

7. A control arrangement for the forward travel of the carriage carrying the abrasive truing wheel (Figures 19 and 20).

The control is carried out by the handwheel 92 carrying a graduation in microns for the control of the movements. This handwheel is keyed on a shaft 93 ended off by a worm at its end 93′, engaging with a corresponding wheel 94 set sideways in a sleeve 95 and that works together through a threaded boring with a control screw 96 centered in bearings 97 and 97′ fixed rigidly with the carriage 4 of the truing abrasive wheel 5, which arrangement provides for the translational movement of the screw 96 and consequently of the carriage and of the abrasive wheel with respect to the longitudinally fixed wheel and nut member 94.

Figures 23, 24, 25:
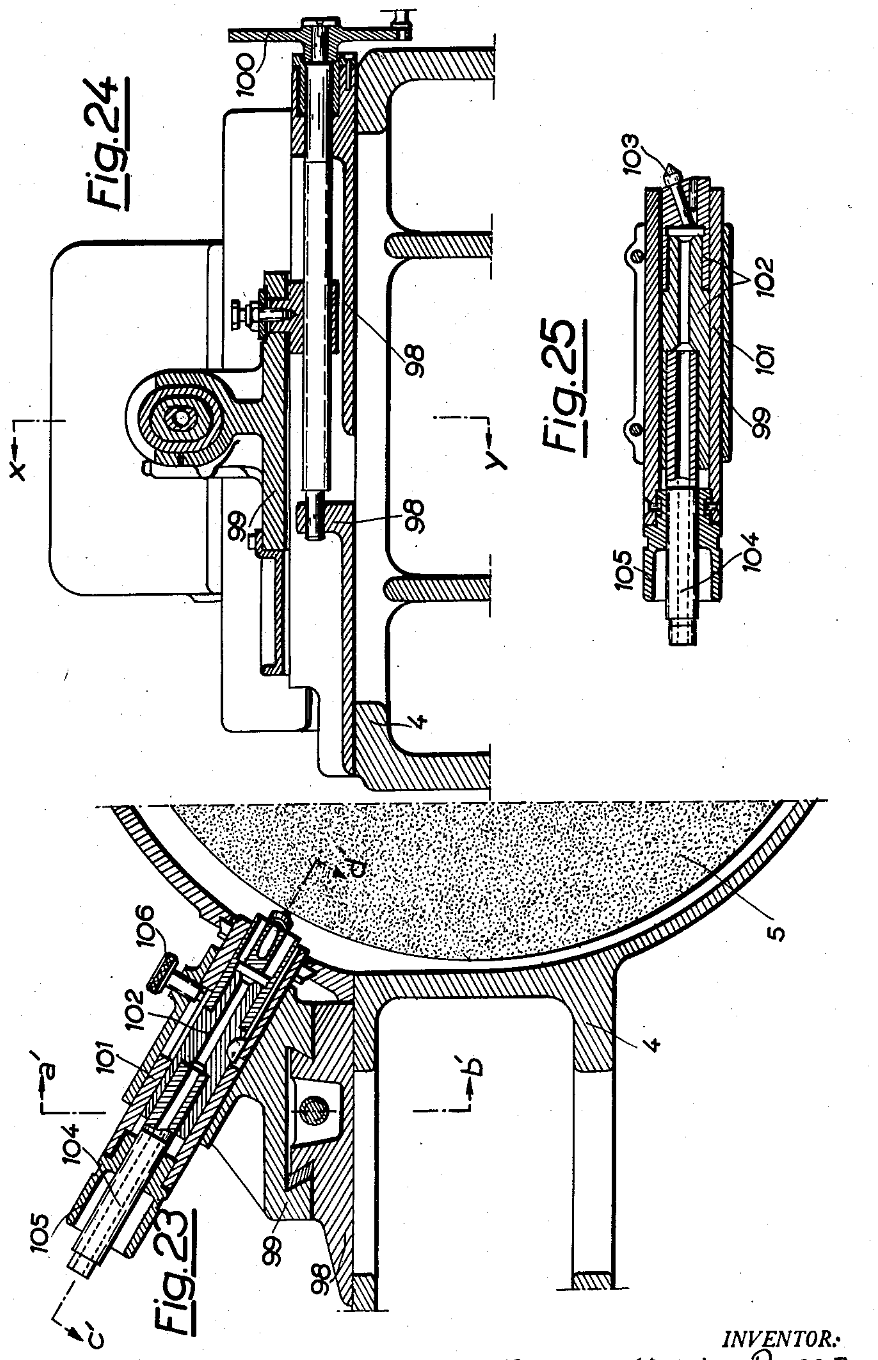
Figure 23 shows on a small scale, an elevational and sectional view along *x*—*y* (Figure 24), of the arrangement for the setting of the truing abrasive wheel.
Figure 24 is a sectional view along *a'*—*b'* (Figure 23), corresponding to Figure 23.
Figure 25 is a part sectional view along *c'*—*d'* (Figure 23).
Figures 26, 27, 28:
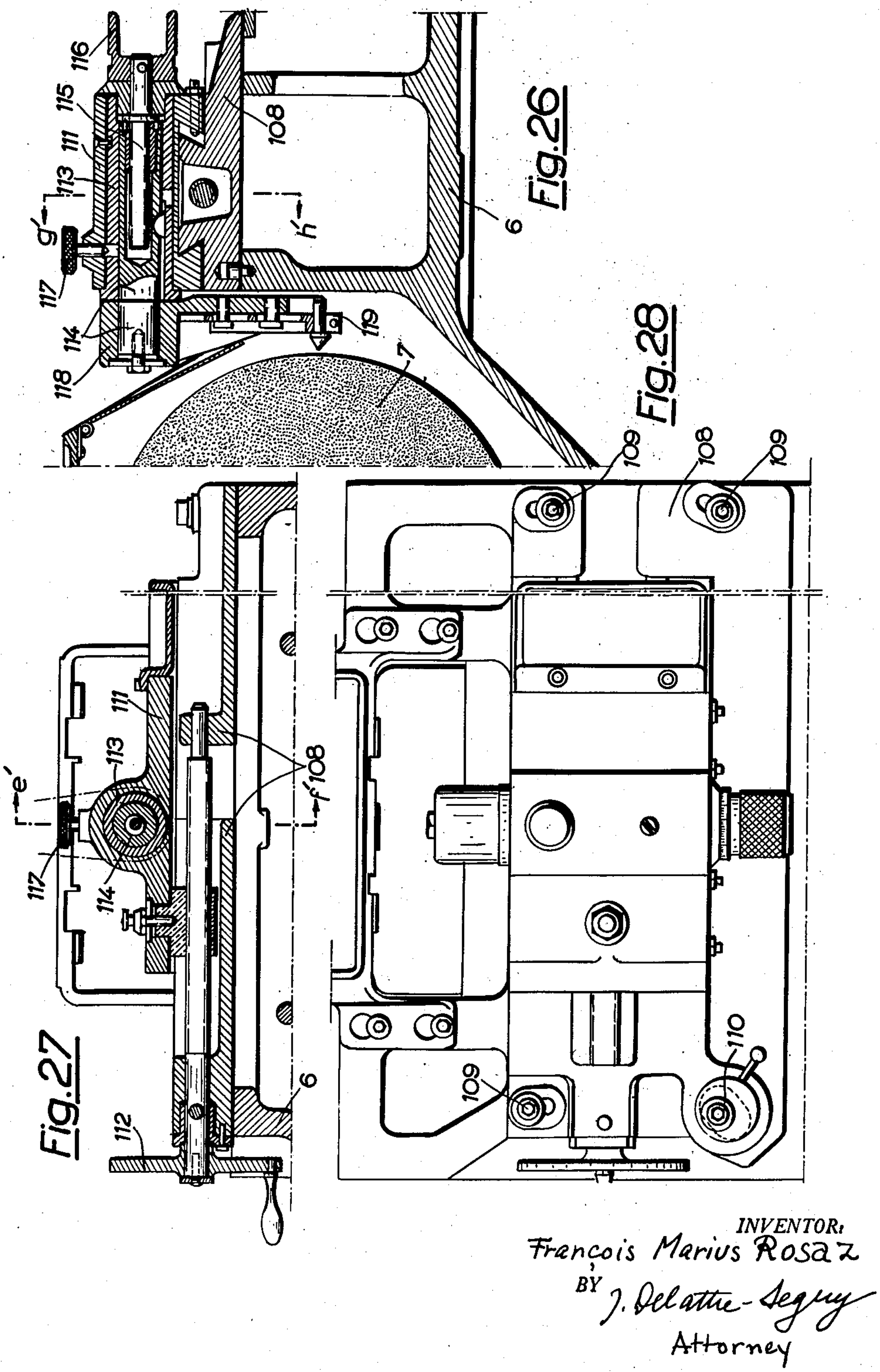
Figure 26 shows on a small scale an elevational and sectional view along *e'*—*f'* (Figure 27), of the arrangement for setting the driving wheel.
Figure 27 is a sectional view along *g'*—*h'* (Figure 26), corresponding to Figure 26.
Figure 28 is an outer plan view corresponding to Figure 27 showing the arrangement for the sloping of the setting device through movement of the bed-plate.

8. Cutting device for the abrasive truing wheel (Figures 23–24 and 25) and cutting device for the driving wheel (Figures 26–27 and 28).

It is often necessary after a shaping operation to perform a recutting of the abrasive truing wheel before the finishing of the truing of the pieces. For this purpose, provision has been made on the carriage 4 of the truing wheel 5 of a footpiece 98 constituting a dovetail slide on which moves the cutting carriage 99 controlled by a working hand-wheel 100 acting through screw and nut. The cutting carriage includes a bearing of which the axis is suitably sloped and that is bored to take the casing 101 of the sleeve 102 that carries the diamond point 103 arranged obliquely, a screw 104 is fixed rigidly with the sleeve and works together with a nut 105 milled on the outside and provided with a vernier for an exact adjustment of the forward travel of the diamond point, the approach adjustment being carried out by moving the sleeve and casing assembly that are clamped in the required position by a screw 106 of which the tip acts in a groove of the casing 101. The screw and the sleeve are drilled through their axis so as to allow the inlet of a strong spray of lubricant that covers the surface of the abrasive wheel during the cutting operation, this lubricant is brought from a supply in the frame, through the action of a pump and through a pipe system 107 that opens at the end of the screw 104.

As the wear of the driving abrasive wheel is fairly slight, the object of cutting it is rather to give the abrasive wheel a suitable shape that may fulfil the demands for the truing of the pieces and obtain a close contact. If the truing wheel is cylindrical in shape and its generating line should remain strictly parallel to its axis, the shape of the driving wheel for successive truing operations is a hyperboloid generated by the rotation round its axis of a generating line that is that of the piece to be trued; the diameter of the piece to be trued has no effect on this hyperboloid, the sharpness of the hyperboloid will be all the more marked as the angle of slope of the abrasive wheel, intended to give the run-off speed to the pieces becomes more marked. It is in respect to these considerations that the cutting device of the driving abrasive wheel is provided with some modifications. On the carriage 6 of the abrasive wheel 7 is fastened the cutting base 108 of which the axis may be sloped slightly, for the cutting of the abrasive wheel in the event of truing of pieces with a slight taper, through unclamping of the screws 109 that may then work in apertures of the base plate in association with the suitable rotation of an eccentric 110 on its pivot. The base 108 constitutes a dovetail slide on which may move the cutting carriage 111 through control of the handwheel 112 acting through screw and nut. The carriage 111 includes a horizontal bearing surface in the bore of which is housed the sleeve 113 that carries in its bore the spindle 114; this spindle has an internal thread and moves along its axis in response to the working of a screw for forward travel 115 controlled by a milled knob 116, both being fastened against translational movement, the knob 116 is provided with a vernier for an accurate adjustment of the feed movement of the diamond point 118, while a screw 117 acting on a capsule or washer ensures a tight clamping of the spindle 114 so as to avoid any misadjustment of the diamond point while cutting is going on. On the end of the spindle 114 is centered and clamped the support of the diamond point 118 in which may slide and is fastened by screw the diamond-holder 119 graduated in respect to its support to adjust and check the position of the diamond in reference to the contact generating line common to the work piece to be trued and to the abrasive wheel 7 as the support, diamond-holder and diamond assembly is located for the cutting inside the carriage, this assembly and the spindle 114, after unclamping of the screw 117 may for adjustment be caused to pivot in the sleeve 113 and suitable adjustment as shown in dotted lines may be proceeded with.

Figure 31:
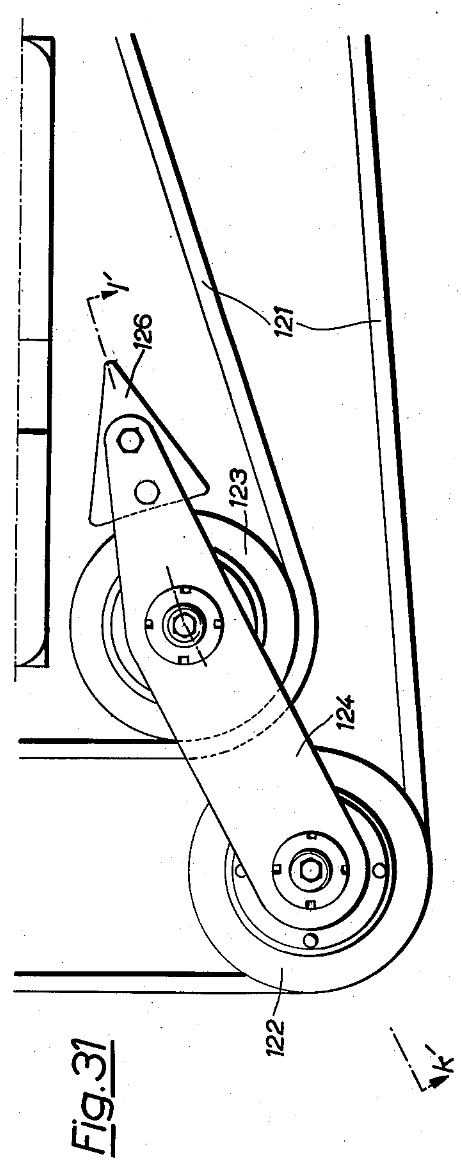
Figure 31 shows on a small scale, an outer elevational view of the tightening device for the belts driving the truing abrasive wheel.
Figure 32:
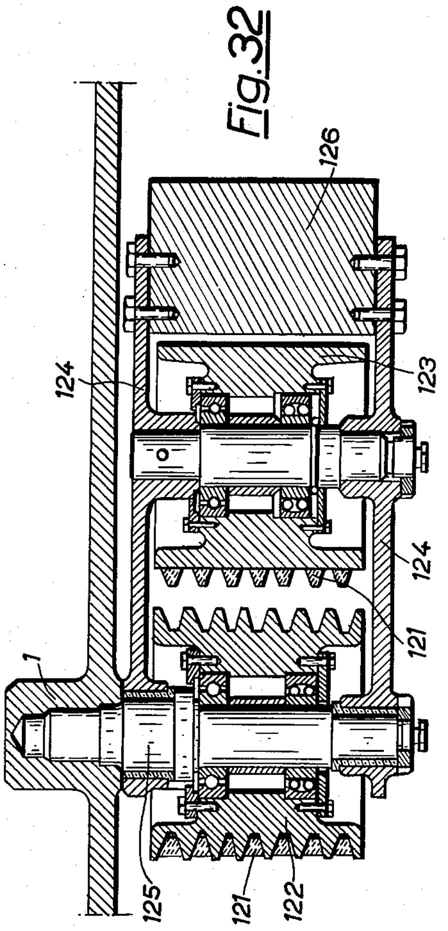
Figure 32 is a sectional view along $k'$—$l'$ (Figure 31) and on a larger scale of the tightening device.

9. Belt tightener (Figures 31 and 32).

The movement of the truing abrasive wheel 5 is taken by the control pulley 19 and the spindle 15 of the working head, this motion is derived from the motor 120 fastened on the frame 1. It is transmitted through the agency of the trapezoidal belts 121 that are tightened and returned by the tightener assembly made up of a grooved pulley 122 and a drum 123 set between two cheek plates 124 centered in a bearing surface of the frame by the spindle 125 of the tightener on which turns also by means of ball-bearings the pulley 122.

On a cross spindle of the cheek plates turns by means of ball bearings the drum 123 while at the end of an outer extension of the cheek plates is fastened a fixed extra weight 126.

Figures 33, 34:
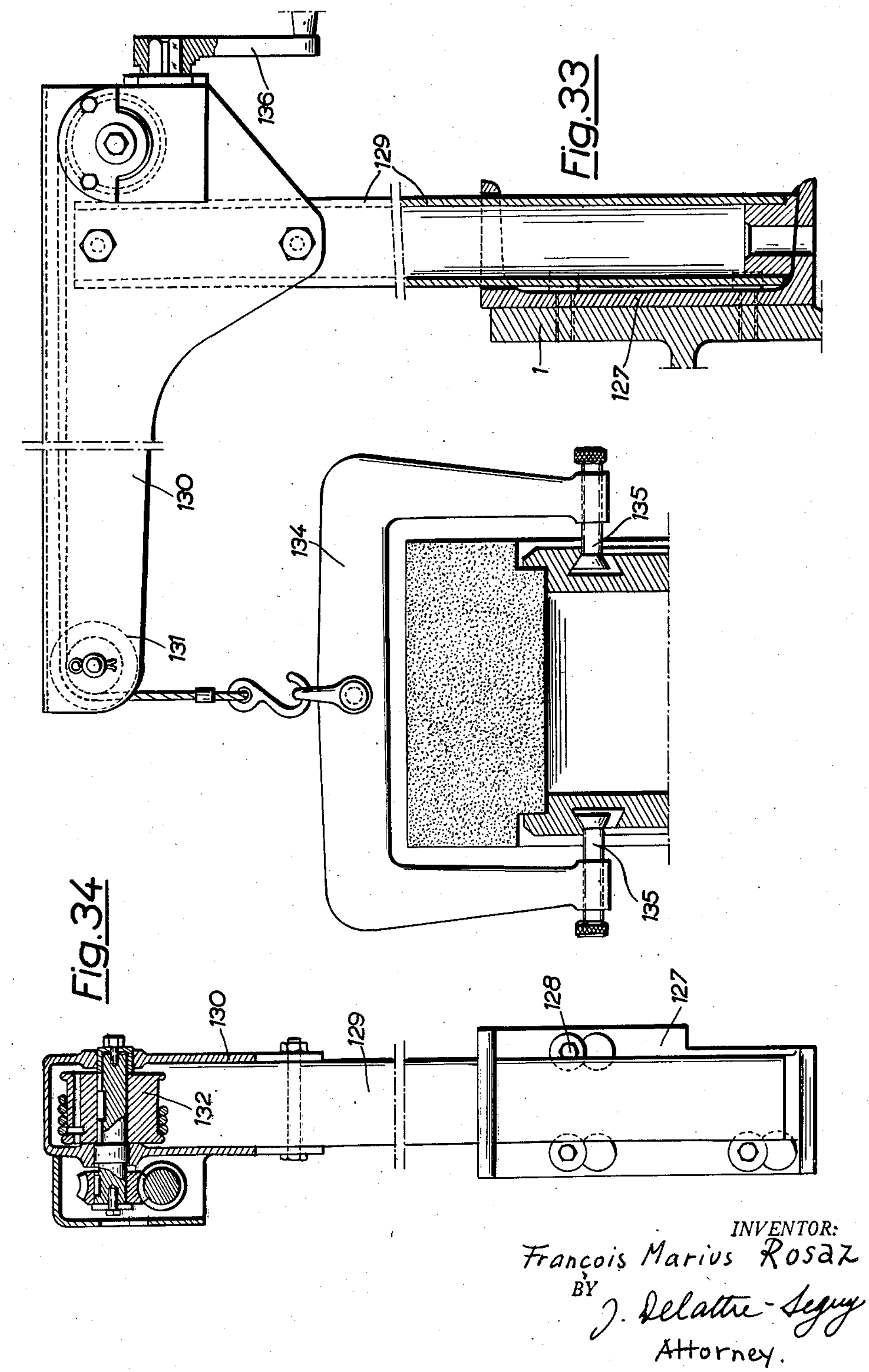
Figure 33 shows on a small scale, an outer view, partly in section of the derrick for hoisting and quick handling of the abrasive wheels.
Figure 34 is an outer side view corresponding to Figure 33.

10. Lifting derrick for the abrasive wheels (Figures 33 and 34) characterised by an overhung support 127 that may be hooked on to screws 128 of the frame 1. On a hub welded to the said support and through a hole provided in this support is adjusted and centered the tube 129 carrying the two overhung arms 130 fastened to the tube and braced by the front pulley 131 and the winding drum 132, on which is fastened the end of the cable 133 wound over said drum and supported by the pulley 131 to end with a seizing hook coupled with the ring of a shackle 134 of which the two arms are provided at their ends with threaded bearing surfaces in which are screwed bushings with a taper end 135 and with a milled knob, these taper ends engaging in corresponding recesses of the cheek plates of the abrasive wheels. The work of hoisting is carried out by a crank handle 136 controlling a worm gear that works together with a wheel keyed on the spindle of the drum 132, this non-reversible system avoiding any accidental dropping of the abrasive wheel during hoisting.

In this way the abrasive wheels may be handled quickly and easily, enabling them to be placed in position and set with great accuracy; in the same way, when it is necessary to change an abrasive wheel, all that has to be done is to unscrew the central bolt 21 and draw apart the spindles and ball-races so as to free the abrasive wheel to be handled.

The characteristic features and improvements incorporated to the machine thus disclosed are finished off by various parts such as a pump, pipe systems and spraying cocks, with distant electric control, all contained together in a case 137 (Figure 1) where they are completely sheltered and provided with holes, etc. but that do not come within the actual scope of the invention defined in accompanying claims and covering a centreless truing machine forming an altogether self-contained assembly, that is stable and improved, while exhibiting every possibility of increased efficiency and adaptability for the type of truing considered that has numerous and well known advantages.

What I claim is:

1. In a centreless grinding machine, the combination of a support including at either end thereof a raised dovetailed slideway including two lateral sections extending to either side of the support with a deep depression between the sections, a carriage adapted to slide over each slideway, a grindwheel revolubly carried by one of the carriages and engaging the depression separating the corresponding slideway sections and a governing wheel revolubly carried by the other carriage and engaging the depression separating the corresponding slideway sections, the grindwheel and governing wheel lying substantially in the same vertical plane, said grindwheel and governing wheel including each an axially hollow hub the side walls of which are inwardly tapering, a driving shaft for each wheel, including a spindle located to either side of the corresponding wheel and terminating with a conical centering tip engaging the tapering part in the corresponding surface of the wheel hub, one of said spindles being hollow, an axial bolt passing through the hollow spindle and screwed into the other spindle, driving means keyed to the outer end of the spindle into which the bolt is screwed, roller bearings and thrust bearings revolubly carrying the spindles and means through which the roller and thrust bearings are supported by the corresponding carriage.

2. In a centreless grinding machine, the combination of a support including at either end thereof a raised dovetailed slideway including two lateral sections extending to either side of the support with a deep depression between the sections, a carriage adapted to slide over each slideway, a grindwheel revolubly carried by one of the carriages and engaging the depression separating the corresponding slideway sections and a governing wheel revolubly carried by the other carriage and engaging the depression separating the corresponding slideway sections, the grindwheel and governing wheel lying substantially in the same vertical plane, said grindwheel and governing wheel including each an axially hollow hub the side walls of which are inwardly tapering, a driving shaft for each wheel, including a spindle located to either side of the corresponding wheel and terminating with a conical centering tip engaging the tapering part in the corresponding surface of the wheel hub, one of said spindles being hollow, an axial bolt passing through the hollow spindle and screwed into the other spindle, driving means keyed to the outer end of the spindle into which the bolt is screwed, roller bearings and thrust bearings revolubly carrying the spindles, a sleeve carrying said roller and thrust bearings, bearings inside which said sleeves are slidably carried, means for removably securing the sleeves rigidly in a predetermined longitudinal position with reference to the last mentioned bearings and means for securing said last mentioned bearings to the corresponding carriages, the bearings corresponding to one carriage being adapted to be adjustably shifted angularly round the axis of the corresponding spindles.

3. In a centreless grinding machine, the combination of a support including at either end thereof a raised dove-tailed slideway including two lateral sections extending to either side of the support with a deep longitudinal depression between the sections, a carriage adapted to slide over each slideway, a grindwheel revolubly carried by one of the carriages and engaging the depression separating the corresponding slideway sections, a governing wheel revolubly carried by the other carriage and engaging the depression separating the corresponding slideway sections, the governing wheel lying substantially in the same vertical plane as the grindwheel, a control shaft for the carriage carrying the governing wheel, said shaft including an eccentric part, a lever controlling the rocking movement of said shaft, a nut member including a lateral recessed chamber, a threaded screw member engaging the nut member and controlling the reciprocation of the governing wheel carriage, a hand wheel controlling said threaded screw member, a bearing inside the recess in the nut member and carrying the eccentric part of the control shaft, the rocking of said control shaft providing a bodily movement of the nut member and threaded member controlling the governing wheel carriage.

4. In a centreless grinding machine, the combination of a support including at either end thereof a raised dove-tailed slideway including two lateral sections extending to either side of the support with a deep longitudinal depression between the sections, a carriage adapted to slide over each slideway, a grindwheel revolubly carried by one of the carriages and engaging the depression separating the corresponding slideway sections, a governing wheel revolubly carried by the other carriage and engaging the depression separating the corresponding slideway sections, the governing wheel lying substantially in the same vertical plane as the grindwheel, a control shaft for the carriage carrying the governing wheel, said shaft including an eccentric part, a lever controlling the rocking movement of said shaft, a nut member including a lateral recessed chamber, a threaded screw member engaging the nut member, a connecting rod of adjustable length connected with said threaded screw member and controlling the reciprocation of the governing wheel carriage, a hand wheel controlling said threaded screw member, a bearing inside the recess in the nut member and carrying the eccentric part of the control shaft, the rocking of said control shaft providing a bodily movement of the nut member and threaded member controlling the governing wheel carriage.

5. In a centreless grinding machine for the grinding of members fed continuously into the machine, the combination of a support including at either end thereof a raised dove-tailed slideway including two lateral sections extending to either side of the support with a deep longitudinal depression between the sections, a carriage adapted to slide over each slideway, a grindwheel revolubly carried by one of the carriages and engaging the depression separating the corresponding slideway sections, a governing wheel revolubly carried by the other carriage and engaging the depression separating the corresponding slideway sections, the governing wheel lying substantially in the same vertical plane as the grindwheel, two couples of removable lever-shaped members adapted to bear the part to be ground through their free outer ends and including a forked inner end, a transversal spindle on which said levers are removably carried through their forked ends, a carrier rigid with said lever-carrying spindle and provided with oblique recesses in its front and rear surfaces, oblique rods pivotally secured to the carrier in planes perpendicular to the transversal spindle, a projection on the outer end of each oblique rod engaging slidingly the corresponding oblique recess in the carrier for holding the corresponding lever-shaped member in contact with the part to be ground and a nut threadedly engaging the outer end of each rod for urging adjustably the corresponding projection against the lever-shaped member actuated thereby.

6. In a centreless grinding machine for the grinding of members fed continuously into the machine, the combination of a support including at either end thereof a raised dove-tailed slideway including two lateral sections extending to either side of the support with a deep longitudinal depression between the sections, a carriage adapted to slide over each slideway, a grindwheel revolubly carried by one of the carriages and engaging the depression separating the corresponding slideway sections, a governing wheel revolubly carried by the other carriage and engaging the depression separating the corresponding slideway sections, the governing wheel lying substantially in the same vertical plane as the grindwheel, two couples of removable lever-shaped members adapted to bear the part to be ground through their free outer ends and including a forked inner end, a transversal spindle on which said levers are removably carried through their forked end, a carrier rigid with said lever carrying spindle and provided with a vertical transversal slot and with oblique recesses in its front and rear surfaces, oblique rods pivotally secured to the carrier in planes perpendicular to the transversal spindle, a projection on the outer end of each oblique rod engaging slidingly the corresponding oblique recess in the carrier for holding the corresponding lever-shaped member in contact with the part to be ground and a nut threadedly engaging the outer end of each rod for urging adjustably the corresponding projection against the lever-shaped member actuated thereby, a supporting member slidingly engaging the slot in the carrier and adapted to form a bearing for the parts to be ground, a camshaft including cams controlling the vertically sliding supporting member, a sun and planet gear controlling said camshaft and a knob controlling said sun and planet gear.

7. In a centreless grinding machine, the combination of a support including at either end thereof a raised dovetailed slideway including two lateral sections extending to either side of the support with a deep longitudinal depression between the sections, a carriage adapted to slide over each slideway, a grindwheel revolubly carried by one of the carriages and engaging the depression separating the corresponding slideway sections, a governing wheel revolubly carried by the other carriage and engaging the depression separating the corresponding slideway sections, the governing wheel lying substantially in the same vertical plane as the grind wheel, a diamond carrier for truing the governing wheel, an auxiliary carriage mounted on the governing wheel carriage to the rear of said governing wheel and adapted to assume a sliding movement in parallelism with the axis of the grindwheel, means controlling the sliding movement of the auxiliary carriage over the governing wheel carriage, a tapped spindle revolubly carried by the auxiliary carriage and adapted to slide longitudinally in parallelism with the direction of sliding of the first two carriages on their slideways, a threaded rod coaxial with and engaging the tapped spindle, means for preventing any longitudinal movement of the threaded rod with reference to the auxiliary carriage to provide for the translational movement of the tapped spindle upon rotation of the threaded rod, means for locking the tapped spindle in the desired adjusted longitudinal position assumed thereby, and means for securing the diamond carrier to the spindle in an adjustable angular relationship with reference thereto.

8. In a centreless grinding machine, the combination of a support including at either end thereof a raised dovetailed slideway including two lateral sections extending to either side of the support with a deep longitudinal depression between the sections, a carriage adapted to slide over each slideway, a grindwheel revolubly carried by one of the carriage and engaging the depression separating the corresponding slideway sections, a governing wheel revolubly carried by the other carriage and engaging the depression separating the corresponding slideway sections, the governing wheel lying substantially in the same vertical plane as the grindwheel, a diamond carrier for truing the governing wheel, an auxiliary carriage mounted on the governing wheel carriage to the rear of said governing wheel and adapted to assume a sliding movement in parallelism with the axis of the grindwheel, means controlling the sliding movement of the auxiliary carriage over the governing wheel carriage, a tapped spindle carried by the auxiliary carriage and adapted to slide longitudinally in parallelism with the direction of sliding of the first two carriages on their slideways, a threaded rod coaxial with and engaging the tapped spindle, means for preventing any longitudinal movement of the threaded rod with reference to the auxiliary carriage to provide for the translational movement of the tapped spindle upon rotation of the threaded rod, means for locking the tapped spindle in the desired adjusted longitudinal position assumed thereby and means for securing the diamond carrier to the spindle and means for adjusting the distance between the diamond carrier and the plane passing through the tapped spindle and parallel to the axis of the grind-wheel.

FRANÇOIS MARIUS ROSAZ.

REFERENCES CITED

The following references are of record in the file of this patent:

14

UNITED STATES PATENTS

| Number | Name | Date |
|---|---|---|
| 1,559,206 | Van Norman | Oct. 27, 1925 |
| 1,575,557 | Einstein et al. | Mar. 2, 1926 |
| 1,579,933 | Heim | Apr. 6, 1926 |
| 1,733,092 | Einstein | Oct. 22, 1929 |
| 1,845,865 | Einstein | Feb. 16, 1932 |
| 1,918,392 | Hohnhorst et al. | July 18, 1933 |
| 2,021,536 | Bath et al. | Nov. 19, 1935 |
| 2,375,306 | Koplin et al. | May 8, 1945 |

FOREIGN PATENTS

| Number | Country | Date |
|---|---|---|
| 903,542 | France | Oct. 8, 1945 |